United States Patent Office 2,739,991
Patented Mar. 27, 1956

2,739,991
PRODUCTION OF BENZENE

George L. Hervert, Downers Grove, Ill., assignor to Universal Oil Products Company, Chicago, Ill., a corporation of Delaware No Drawing. Application July 30, 1952,
Serial No. 301,785

13 Claims. (Cl. 260—672)

This application relates to a process for the manufacture of benzene from a toluene-containing hydrocarbon charging stock. More specifically, the invention concerns a process involving an alkyl transfer reaction of the methyl group of toluene to an aromatic compound which acts in the capacity of an alkyl acceptor, benzene being the principal, desired product of the process.

For the production of many organic-derived chemical and industrial products for particular uses, benzene is preferred over toluene as the starting material for the product and in many cases only benzene, rather than toluene will yield the product having the desired or required physical and chemical properties. A typical instance of the preferential use of benzene rather than toluene in the manufacture of a product is the manufacture of alkylaryl sulfonate detergents in which benzene produces an ultimate detergent product having more of the desired physical properties for detergents, such as a lesser degree of hygroscopicity than the corresponding alkyl aromatic sulfonate derivative of toluene. Because of such general preferences for benzene as the starting material in the synthesis of organic compounds where applicable, benzene is normally in greater demand and in shorter supply than toluene. The present invention provides a process of converting toluene to the preferred benzene.

In its broad aspects the present invention relates to a process for converting toluene into benzene by reacting toluene with an alkylatable aromatic compound at methyl transfer reaction conditions.

In one of its more specific embodiments, the invention concerns a process for the demethylation of toluene to produce benzene which comprises reacting toluene with a polycyclic aromatic compound containing a nuclearly replaceable hydrogen atom in the presence of an acid-acting catalyst and at a temperature of from about 0° to about 300° C.

The feed stock for the present demethylation reaction may comprise substantially pure toluene or a hydrocarbon-toluene concentrate containing at least 30% by weight of toluene, such as a hydrocabon fraction containing the various paraffinic and naphthenic, azeotropes of toluene separated from the product of a hydrocarbon conversion reaction and boiling generally within the range of from about 103° to about 112° C. Such toluene-containing fractions may be separated, for example, from the product of a typical hydrocarbon reforming reaction, particularly, a reformed straight-run gasoline fraction in which mono- and dialkyl naphthenes are present, the latter yielding toluene during the course of the reforming conversion. Toluene also occurs naturally in certain petroleum crudes and may be separated therefrom as a concentrate containing at least 30% toluene by fractional distillation of the original crude. In a similar manner toluene-containing fractions may be separated from the products of a petroleum cracking reaction by means of fractional distillation. Hydrocarbon fractions containing a greater proportion of toluene, in some cases up to 100% toluene, may be separated from such toluene-containing hydrocarbon fractions by adsorption or by extractive separation procedures utilizing selective solvents for toluene well known in the art.

The reactant in the present feed stock mixture which acts in the capacity of a methyl alkyl group acceptor during the demethylation or alkyl transfer reaction is a material herein characterized as an aromatic compound capable of yielding a nuclear substituent group or containing a replaceable nuclear hydrogen atom which is replaced during the demethylation reaction with the methyl group derived from toluene. The structure of the aromatic compound which acts as the methyl acceptor during the reaction may be either mono- or polycyclic, such as the phenyl and alkylphenyl halides, including such typical representative compounds of this class as monochlorobenzene, dichlorobenzene, the mono- and dibromo- and iodobenzene, the para-halogen substituted toluenes such as p-chloro-, p-bromo-, and p-iodotoluenes and others; the phenols and alkyl-substituted phenols, preferably containing not more than one nuclear alkyl group per molecule in which the alkyl group contains not more than about four carbon atoms per group, including such typical compounds as phenol, the various cresols, such as the ortho-, meta-, and para-methyl phenols and others of this group, naphthalene and its nuclear halogen-substituted and alkyl-substituted derivatives such as alpha-methylnaphthalene, beta-methylnaphthalene, alpha-ethylnaphthalene, and the various isomeric dimethyl-substituted naphthalenes; the nuclearly halogen-substituted naphthalenes, such as alpha-chloronaphthalene, beta-chloronaphthalene, the alpha- and beta-bromo-substituted naphthalenes; the nuclear hydroxy-substituted naphthalenes such as alpha- and beta-naphthols; the halogen-substituted naphthols such as 6-bromo-alpha-naphthol; anthracene, phenanthrene, and other polynuclear aromatic hydrocarbons and their alkylatable mono- and dialkyl-substituted derivatives as well as the mono- and polyhalogen-substituted derivatives, particularly the polycyclic hydrocarbons found in petroleum fractions having relatively high boiling points, such as gas oil and lubricating oil fractions of petroleum and its conversion products. In order to function as the methyl acceptor (that is, to act as the demethylating agent of toluene) in the present alkyl transfer reaction, the aromatic compound functioning in the reaction as the methyl acceptor reactant must contain a replaceable nuclear hydrogen atom or other replaceable radical such as the aforesaid halogen substituents, the latter radicals being sufficiently labile to undergo displacement during the course of the demethylation reaction and replaced by the methyl group derived from the toluene reactant.

The present methyl transfer reaction is promoted by the presence of a catalyst characterized as an acid-acting inorganic compound in the reaction mixture belonging to the relatively broad group of catalysts known as acid-acting materials. The Friedel-Crafts metal halides such as aluminum chloride and aluminum bromide (preferably in the presence of the corresponding anyhdrous hydrogen halides), ferric chloride, zinc chloride, tin chloride, bismuth chloride and a large number of other inorganic halides well known as Friedel-Crafts methyl halides are among the preferred catalysts utilizable in the present alkyl transfer reaction. The preferred acid-acting catalysts are such materials as boron trifluoride, the inorganic mineral acids, such as sulfuric acid of at least 85% by weight sulfuric acid, liquefied hydrogen fluoride or hydrofluoric acid containing at least 90% by weight of hydrogen fluoride, phosphoric acid, particularly pyrophosphoric acid, which may be supported on a suitable siliceous adsorbent, or other inorganic compounds known for their acid-acting catalytic activities. Another group of catalysts particularly suitable for low temperature alkyl transfer reactions are the addition complexes of organic ethers, ketones, alcohols and aldehydes and one of the relatively more active members of the above acid-acting types of catalysts, including such typical representative materials as aluminum chloride monomethanolate, aluminum chloride monoethanolate, aluminum chloride monoetherate, aluminum chloride monoacetonate and the corresponding mono-addition complexes of boron trifluoride, aluminum bromide and ferric chloride with such organic compounds as acetone, methanol, ethanol, dimethyl ether, acetaldehyde, etc. The catalysts may be generally separated from the hydrocarbon components of the reaction mixture following the alkyl transfer reaction by simple phase separation between the resulting catalyst-containing sludge and the hydrocarbon portion of the reaction mixture. In general, the used catalyst may be recycled to the reaction as separated from the reaction mixture or mixed with additional fresh catalyst, and the resulting mixture supplied to a subsequent alkyl transfer reaction involving the same or different reactants.

In accordance with the present invention, toluene or a toluene-containing hydrocarbon fraction is mixed with the alkyl acceptor compound, such as the preferred naphthalenes and their alkyl derivatives containing a replaceable nuclear hydrogen atom and the resulting mixture contacted with the acid-acting catalyst at a temperature of from about 0° to about 300° C., preferably from about 30° to about 150° C. while maintaining the reaction mixture under sufficient pressure to provide substantially liquid phase conditions during the reaction, generally at pressures of from atmospheric to about 1500 pounds per square inch. Under these conditions a transfer of the methyl group from toluene to the alkyl acceptor aromatic compound contained in the reaction mixture occurs, yielding benzene as the desired product of the reaction. The methyl derivative of the alkyl acceptor compound involved in the reaction may be separated from the reaction mixture as a side-product of the reaction.

It is generally preferred to utilize a molar excess of the alkyl acceptor compound in the reaction mixture in order to induce more complete transfer of the toluene-methyl group to the alkyl acceptor reactant in accordance with the principles of the mass action law. Particularly preferred molar ratios of the reactants lie within the range of from 5 to 1 to about 20 to 1 mols of alkyl acceptor compound to toluene charged into the alkyl transfer reaction.

Following completion of the reaction, determined by removing a sample of the reaction product during the course of the reaction and noting when the proportion of benzene in the product fails to increase further, the used catalyst is allowed to separate from the hydrocarbon product and unreacted components of the reaction mixture, after which the catalyst phase may suitably be removed by decantation, washing or other removal procedures. Benzene being the most volatile component of the reaction mixture may be allowed to distill from the mixture as formed or after removal of the mixture from the reaction vessel. The particularly preferred procedure comprises distilling the benzene from the reaction mixture as it is formed therein, particularly when a relatively more volatile catalyst is employed in the reaction and when the reaction mixture is heated to temperatures above the boiling point of benzene.

The reaction may be conducted on a batch or continuous basis and in any suitable equipment for containing the generally corrosive acid catalyst and for maintaining the volatile components of the reaction mixture in substantially liquid phase during the course of the reaction. A suitable form of mixing device is desirably incorporated into the reaction vessel in order to maintain the catalyst intimately dispersed throughout the mixture of organic reactants. A particularly useful type of reactor is a closed chamber which may be rotated on its axis, such as a rotated pressure autoclave or stirred autoclave.

The invention is further illustrated with respect to certain of its embodiments in the following example, which, however, is not intended to limit the generally broad scope of the invention in strict accordance therewith.

In the following run toluene and methylnaphthalene were reacted at alkyl transfer reaction conditions in the presence of an acid-acting catalyst comprising aluminum chloride to form benzene as the desired product of the reaction and a high boiling hydrocarbon fraction believed to contain dimethylnaphthalenes. 426 grams (3 moles) of alpha-methylnaphthalene was charged into a rotating pressure autoclave and cooled to approximately 0° C. as 92 grams (1 mole) of toluene containing approximately 19 grams of aluminum chloride dissolved therein were added to the naphthalene. The autoclave was sealed, charged with 3 grams of anhydrous hydrogen chloride and nitrogen to a pressure of 150 pounds per square inch and thereafter heated to a temperature of 70° C. while the contents of the autoclave were stirred by rotating the apparatus. The reaction was continued for a period of one hour, following which the autoclave was cooled to 0° C., the pressure released, and the contents poured into one liter of water. The upper hydrocarbon phase was separated from the aqueous phase, dried over calcium chloride and distilled at atmospheric pressure to separate the hydrocarbon components therefrom. 21 grams of a fraction boiling between 75–100° C. were separated as the initial boiling fraction containing 70% benzene representing a yield of benzene from the reaction of approximately 5 mole per cent. An azeotropic mixture of monomethyl and dimethyl naphthalenes boiling at a temperature of about 248° C. may be separated from the hydrocarbon product of the alkyl transfer reaction.

I claim as my invention:

1. A process for converting toluene into benzene which comprises reacting toluene with an alkylatable aromatic compound other than toluene at methyl transfer reaction conditions in the presence of an acid-acting catalyst.

2. The process of claim 1 further characterized in that said reaction is effected at a temperature of from about 0° to about 300° C.

3. The process of claim 1 further characterized in that the said alkylatable aromatic compound is maintained in the reaction zone in a molar excess, based upon the number of moles of toluene maintained in the reaction mixture.

4. The process of claim 3 further characterized in that the molar ratio of alkylatable aromatic compound to toluene is from about 5 to 1 to about 20 to 1.

5. The process of claim 1 further characterized in that said acid-acting catalyst is a Friedel-Crafts metal halide.

6. The process of claim 1 further characterized in that said catalyst is aluminum chloride.

7. The process of claim 1 further characterized in that said catalyst comprises a mineral acid.

8. The process of claim 1 further characterized in that said catalyst comprises hydrogen fluoride.

9. The process of claim 1 further characterized in that said alkylatable aromatic compound is a polycyclic aromatic hydrocarbon containing a nuclearly displaceable hydrogen atom.

10. The process of claim 9 further characterized in that said polycyclic aromatic hydrocarbon is a naphthalene.

11. The process of claim 10 further characterized in that said naphthalene is an alkylnaphthalene.

12. A process for the demethylation of toluene to produce benzene which comprises reacting toluene with a polycyclic aromatic compound containing a nuclearly displaceable hydrogen atom in the presence of an acid-acting catalyst at a temperature of from about 0° to about 300° C.

13. A process for the production of benzene from toluene which comprises reacting toluene with alpha-methylnaphthalene at a temperature of from about 30° to about 150° C. in the presence of aluminum chloride and at a pressure sufficient to maintain the reaction mixture in substantially liquid phase.

References Cited in the file of this patent

UNITED STATES PATENTS

| | | |
|---|---|---|
| 2,222,632 | Sachanen et al. | Nov. 26, 1940 |
| 2,335,596 | Marschner | Nov. 30, 1943 |
| 2,403,748 | Olin | July 9, 1946 |
| 2,418,689 | Benedict et al. | Apr. 8, 1947 |
| 2,528,893 | Lien et al. | Nov. 7, 1950 |
| 2,692,293 | Heinemann | Oct. 19, 1954 |